United States Patent [19]

Bruckmann et al.

[11] Patent Number: 5,403,176
[45] Date of Patent: Apr. 4, 1995

[54] TAPERED INSERT DIE PLATE FOR UNDERWATER PELLETIZERS

[75] Inventors: Theodor Bruckmann, Xanten, Germany; Donald H. Saville, Eagle Rock, Va.

[73] Assignee: Gala Industries, Inc., Winfield, W. Va.

[21] Appl. No.: 648,619

[22] Filed: Feb. 1, 1991

[51] Int. Cl.[6] ............................................. A01J 21/00
[52] U.S. Cl. ....................... 425/464; 425/72.1; 425/142; 425/185; 425/191; 425/313
[58] Field of Search .................. 264/142; 425/191 S, 425/192 S, 185, 191, 464, 72.1, 311, 313

[56] References Cited

U.S. PATENT DOCUMENTS

| | | | |
|---|---|---|---|
| 938,047 | 10/1909 | Fish | 425/464 |
| 2,591,508 | 4/1952 | Brown | 425/191 |
| 2,758,337 | 8/1956 | Kivley | 425/191 |
| 2,839,783 | 6/1958 | DeWolf | 425/464 |
| 3,049,753 | 8/1962 | Ogden et al. | 425/464 |
| 3,299,470 | 1/1967 | Stockbridge | 425/192 S |
| 3,299,471 | 1/1967 | Hench | 425/192 S |
| 3,357,051 | 12/1967 | Zolotarevsky | 425/464 |
| 3,427,685 | 2/1969 | Gove et al. | 425/464 |
| 3,985,481 | 10/1976 | Brackmann et al. | 425/464 |
| 4,050,866 | 9/1977 | Kilsdouk | 425/192 S |
| 4,148,598 | 4/1979 | Colosimo et al. | 425/464 |
| 4,248,577 | 2/1981 | Bory et al. | 425/464 |
| 4,285,651 | 8/1981 | Fetcho et al. | 425/464 |
| 4,421,470 | 12/1983 | Nakamura | 425/311 |
| 4,457,685 | 7/1984 | Huang et al. | 425/464 |
| 4,493,628 | 1/1985 | Lenk | 425/192 S |
| 4,516,926 | 5/1985 | Yip | 425/464 |
| 4,621,996 | 11/1986 | Hundley, III | 425/190 |
| 4,678,423 | 7/1987 | Bertolotti | 425/464 |
| 4,710,113 | 12/1987 | Voigt | 425/311 |
| 4,764,100 | 8/1988 | Lambertus | 425/311 |

FOREIGN PATENT DOCUMENTS

| | | | |
|---|---|---|---|
| 2245174 | 3/1973 | Germany | 425/192 S |
| 47-33728 | 8/1972 | Japan . | |
| 300775 | 9/1965 | Netherlands | 425/192 S |

Primary Examiner—David A. Simmons
Assistant Examiner—Paul M. Rivard
Attorney, Agent, or Firm—Jacobson, Price, Holman & Stern

[57] ABSTRACT

A tapered insert die plate providing a surface-to-surface contact between the insert and die plate to facilitate removal of and insertion of the insert and substantially improve heat transfer from the outside ring of the die plate to the die insert. The tapered insert is retained in place by hold down bolts which serve as jack bolts to force the insert out of the outer ring of the die plate by insertion into screw threaded holes in the insert to abuttingly engage a flange surface on the outer ring of the die plate to facilitate extraction of the insert when required. The die plate insert includes a plurality of orifices extending therethrough through which molten polymers are extruded in a conventional manner with the tapered surface-to-surface contact between the insert and the die plate providing improved heat transfer from the outside ring of the die plate to the die plate insert as compared with other known techniques of mounting an insert in a die plate.

2 Claims, 1 Drawing Sheet

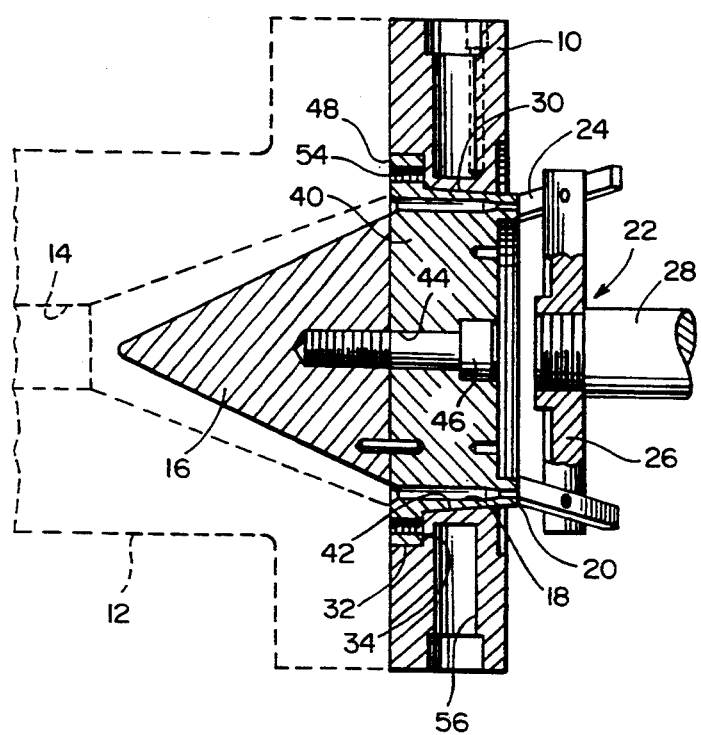
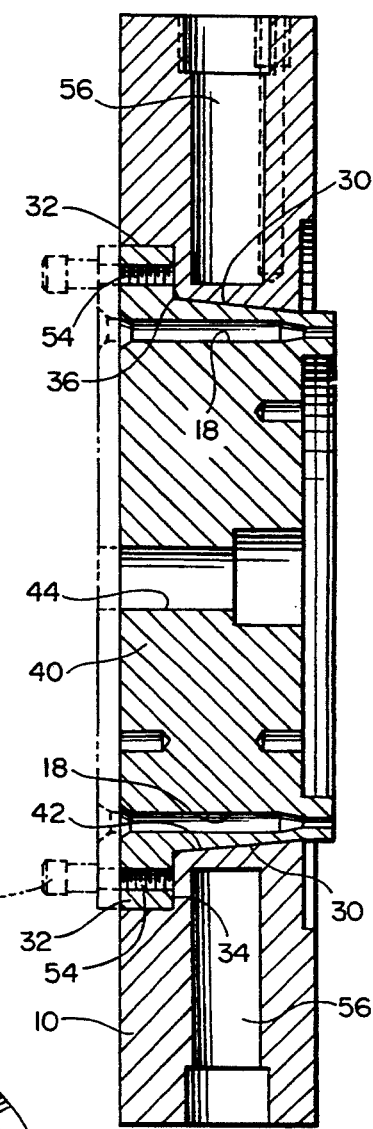
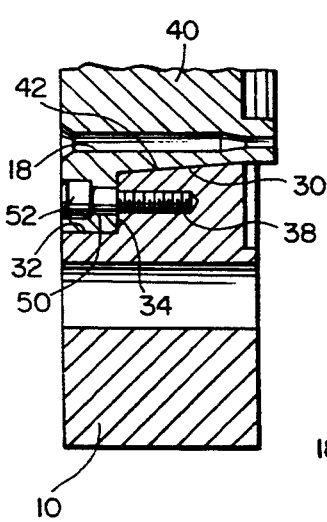
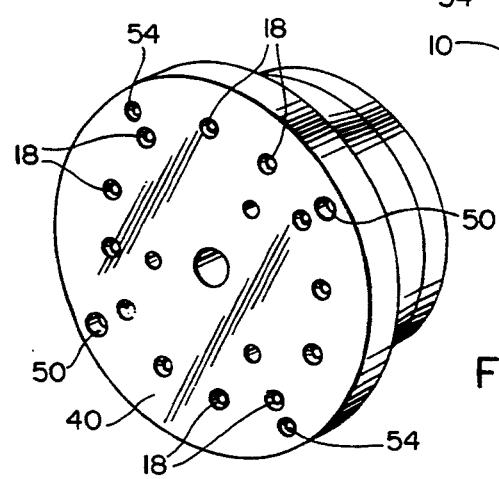

TAPERED INSERT DIE PLATE FOR UNDERWATER PELLETIZERS

BACKGROUND OF THE INVENTION

1. Field Of The Invention

The present invention generally relates to improvements in the die plate of an underwater pelletizer. More specifically, the invention relates to a tapered insert die plate providing a surface-to-surface contact between the insert and die plate to facilitate removal of and insertion of the insert and substantially improve heat transfer from the outside ring of the die plate to the die insert. The tapered insert is retained in place by hold down bolts which serve as jack bolts to force the insert out of the outer ring of the die plate by insertion into screw threaded holes in the insert to abuttingly engage a flange surface on the outer ring of the die plate to facilitate extraction of the insert when required. The die plate insert includes a plurality of orifices extending therethrough through which molten polymers are extruded in a conventional manner with the tapered surface-to-surface contact between the insert and the die plate providing improved heat transfer from the outside ring of the die plate to the die plate insert as compared with other known techniques of mounting an insert in a die plate.

2. Description Of The Prior Art

Prior U.S. Pat. No. 4,621,996 issued Nov. 11, 1986 discloses an extrusion die plate having a removable central insert provided with extrusion orifices therein in which the insert is screw threadedly mounted in the outer ring of the die plate. This type of structure operates satisfactorily but in some instances, it is difficult to remove the insert from the outer ring of the die plate when it is desired to replace the insert. The prior art of record in that case and the following U.S. patents are also relevant to developments in this field of endeavor.

U.S. Pat. No. 4,269,584
U.S. Pat. No. 4,710,113
U.S. Pat. No. 4,764,100
U.S. Pat. No. 4,934,916
U.S. Pat. No. 3,323,170
U.S. Pat. No. 3,355,767

None of the prior art discloses an arrangement in which an underwater plastic pelletizer includes an extrusion die plate having a central insert provided with extrusion orifices which is provided with a tapered external surface for surface-to-surface engagement with a correspondingly tapered internal surface on the outer ring of the die plate. Further, the prior art does not disclose an arrangement in which the hold down bolts which retain the insert in place in the outer ring of the die plate are removed and used as jack bolts to extract the central insert from the outer ring of the die plate.

SUMMARY OF THE INVENTION

An object of the present invention is to provide an extrusion die plate for use in underwater pelletizers in which a central insert is mounted in an opening extending through the die plate with the insert including a plurality of passageways forming nozzles or orifices for extrusion of molten polymer into a strip which is formed into pellets in the pelletizer in a conventional and well known manner with the external surface of the insert and the internal surface of the opening in the outer ring of the die plate being correspondingly tapered for contacting engagement throughout the correspondingly tapered surfaces to provide most effective heat transfer from the outside ring of the die plate to the die plate insert.

Another object of the invention is to provide a tapered insert for a die plate as set forth in the preceding object in which the opening in the die plate and the insert include opposed peripheral flange portions with hold down bolts extending through apertures in the flange on the insert and being threaded into internally threaded bores in the flange on the outside ring of the die plate for holding the insert in the die plate with the hold down bolts being removable and threaded into and through internally threaded apertures in the flange on the insert with the inner ends thereof abuttingly engaging the flange on the periphery of the opening through the die plate to serve as jack bolts to extract the insert from the outer ring of the die plate.

A further object of the present invention is to provide an insert for an extrusion die plate in which the insert and opening through the die plate is tapered to provide maximum heat transfer and provided with a retaining structure which can also be used to more efficiently extract the insert from the outer ring of the die plate with this structure enabling interchange of inserts in an efficient and less time consuming manner with the removal and replacement of the insert capable of being performed by the use of relatively unskilled personnel.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectional view of a die plate illustrating the structural association of the tapered insert with extrusion orifices therein and the outer ring of the die plate.

FIG. 2 is a sectional view similar to FIG. 1 but illustrating the hold down bolts being removed from their hold down position and being used as jack bolts to extract the insert from the die plate.

FIG. 3 is a detailed sectional view showing use of the hold down bolts.

FIG. 4 is a perspective view of the tapered insert for the die plate.

DESCRIPTION OF THE PREFERRED EMBODIMENT

Referring now specifically to the drawings, an extrusion die plate assembly is illustrated in FIG. 1 and is designated by reference numeral 10. The die plate is utilized in an underwater plastic pelletizer with the die plate being associated with the remainder of the pelletizer in a well known manner such as illustrated in FIG. 1 and which includes an inlet housing 12 having a passageway 14 therein for molten polymer diverted by nose cone 16 through a plurality of extrusion orifices 18 to extrude a continuous ribbon from the downstream side of the die plate provided with a wear surface 20. The wear surface 20 is usually formed by a wear ring or the like and is associated with a knife assembly 22 including a plurality of blades 24 supported by a holder 26 connected with a driven shaft 28 which is generally the same structure as illustrated in U.S. Pat, No. 4,621,996. The die plate 10 includes a central opening 30 therein which is generally circular and provided with a longitudinal taper having a larger diameter at the end thereof which faces the inlet housing 12 and a smaller diameter at the end thereof facing the knife assembly 22. The die plate 10 includes a peripheral recess 32 at the larger diameter end of the opening 30 with the recess 32 extending from the surface of the outer ring of the die plate 10 inwardly a short distance and terminating in a radial shoulder or flange 34 which extends inwardly and merges with the opening 30 with the corner juncture being chamfered as at 36. The outer ring of the die plate 10 also includes a plurality of circumferentially spaced internally threaded blind bores 38 which extend inwardly in the outer ring of the die plate 10 from the surface of the flange 34.

A tapered insert 40 is positioned in the opening 30 and includes an external tapered surface 42 which has a taper corresponding to the taper of the opening 30 to engage the surface of the opening 30 in a continuous surface-to-surface relationship to provide maximum heat transfer from the outside ring of the die plate 10 to the insert 40 which also has the plurality of extrusion nozzles 18 extending therethrough with the extrusion nozzles including a funnel shape inlet end, an elongated cylindrical portion and a tapered outlet end extending to and through the wear ring in a conventional manner. The insert also includes a shouldered opening 44 to receive a cap bolt 46 to anchor the nose cone 16 thereto. The larger end of the tapered insert 40 is provided with a peripheral flange 48 thereon which is received in the recess 50 with the inner surface of the flange 48 resting against and engaging the radial shoulder 34 to position the insert in relation to the die plate 10 and provide continuous surface-to-surface engagement of the flange 48 with the recess 32 and shoulder 34. The flange 48 includes a plurality of shouldered apertures 50 therethrough for receiving hold down cap bolts 52 which have their threaded inner ends threadedly engaged with the internally threaded bore 38 in the outer ring of the die plate 10 thus serving to securely hold the insert 40 in assembled relation to the die plate 10.

The flange 48 on the insert 40 also includes a plurality of circumferentially spaced internally threaded apertures 54 which threadedly receive the hold down bolts 52 when the hold down bolts 52 have been removed from their hold down position. The hold down bolts 52 when they have been removed from screw threaded engagement with the threaded bores 38 and removed from the apertures 50, are then threaded into the internally threaded bores 54 with the inner end surfaces of the bolts then abuttingly engaging the shoulder 34 to serve as jack bolts to extract the insert from the opening 30 in an effective manner by threading the bolts 52 inwardly to cause the insert 40 to back out of the opening 30. This structure enables quick, dependable and positive removal of the insert 40 from the die plate 10 thereby facilitating removal of the insert and efficient interchange of inserts when desired such as to enable cleaning of the orifices and changing the insert to one having a different orifice arrangement.

The die plate and insert function in the same general manner as in U.S. Pat. No. 4,621,996 but the tapered surfaces on the opening 30 and the insert 40 provides maximum heat transfer from a heater positioned in radial recesses 56 or from other types of heat such as an oil heated or steam heated die plate in a well known manner.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a pelletizer, the combination of an extrusion die plate, and a die plate insert, said die plate including an opening extending therethrough from an upstream side of the die plate to a downstream side of the die plate, said die plate insert being positioned in said opening and in surface-to-surface contact with the periphery of said opening and including a plurality of circumferentially spaced extruding nozzles extending from the upstream of the die plate insert to the downstream side thereof for extruding material therethrough, said die plate including a recess in the upstream side thereof extending peripherally of the opening and defining a radially extending shoulder inwardly of the upstream side of the die plate, the depth of the recess being less than one-half of the thickness of the die plate, said die plate insert including a peripheral flange received in the recess and engaging the shoulder with the thickness of the flange being substantially the same as the depth of the recess to position the upstream side of the die plate insert substantially in alignment with the upstream side of the die plate, said flange including a plurality of circumferentially spaced smooth surface openings extending therethrough, said shoulder including a plurality of internally threaded bores aligned with the smooth surfaced openings in the flange, a screw threaded cap bolt received in each of said smooth surfaced openings in the flange and threaded into the threaded bores in the shoulder for securing the flange in engagement with the shoulder, said flange including a plurality of circumferentially spaced internally threaded bores extending therethrough with the threaded bores in the flange having threads identical to threads in the threaded bores in the shoulder to receive threads on said cap bolts, said threaded bores in the flange being in circumferentially spaced relation to the smooth surfaced openings in the flange and in circumferentially spaced relation to the threaded bores in the shoulder when the cap bolts are received in the openings in the flange and threaded bores in the shoulder, said shoulder including imperforate portions between the circumferentially spaced threaded bores in the shoulder, said cap bolts being removable from threaded engagement with the threaded bores in the shoulder and the openings in the flange and threaded through the threaded bores in the flange with the inner ends abuttingly engaging the imperforate portions of the shoulder to move the flange away from the shoulder to extract the die plate insert from the opening in the die plate, said pelletizer being an underwater pelletizer and the extrusion nozzles receive molten polymer therethrough for extruding a continuous ribbon from the downstream side of the die plate, said die plate including heating means to retain the extruded polymer in a molten state during passage through the nozzles with the surface-to-surface contact between the opening in the die plate and the periphery of the die plate insert providing optimum heat transfer to the extrusion nozzles extending through the die plate insert, said extrusion nozzles being positioned adjacent the periphery of the die plate insert and in parallel relation to each other to provide optimum heat transfer to the polymer being extruded.

2. The combination as defined in claim 1 wherein said opening in the die plate tapers inwardly from the edge of the recess to the downstream side thereof, the angle of taper of the internal surface of the opening being small to maintain the perimeter of the upstream side of the opening only slightly greater than the perimeter of the downstream side of the opening through the die plate, the periphery of the die plate insert between the flange and the downstream side of the die plate insert tapering at a corresponding angle to the taper of the opening to provide a continuous surface-to-surface contact between the interior of the opening extending through the die plate and the external periphery of the die plate insert between the shoulder and the downstream side of the die plate, the inner surface of the flange being in surface-to-surface engagement with the shoulder and the external periphery of the flange being in close fitting relation to the recess to provide maximum heat transfer capabilities between the die plate and die plate insert.

* * * * *